United States Patent
Abhau

(10) Patent No.: US 9,805,277 B2
(45) Date of Patent: Oct. 31, 2017

(54) APPARATUS AND METHOD FOR DETECTING BAR-TYPE TRAFFIC SIGN IN TRAFFIC SIGN RECOGNITION SYSTEM

(71) Applicant: MANDO CORPORATION, Gyeonggi-do (KR)

(72) Inventor: Jochen Abhau, Frankfurt am Main (DE)

(73) Assignee: MANDO CORPORATION, Gyeonggi-Do (KR)

( * ) Notice: Subject to any disclaimer, the term of this patent is extended or adjusted under 35 U.S.C. 154(b) by 29 days.

(21) Appl. No.: 15/088,083

(22) Filed: Mar. 31, 2016

(65) Prior Publication Data
US 2016/0321510 A1    Nov. 3, 2016

(30) Foreign Application Priority Data
Apr. 29, 2015    (DE) .......................... 10 2015 207 903

(51) Int. Cl.
*G06K 9/00*    (2006.01)
*G06K 9/62*    (2006.01)

(52) U.S. Cl.
CPC ....... *G06K 9/00818* (2013.01); *G06K 9/6247* (2013.01)

(58) Field of Classification Search
CPC .......... G06K 2009/485; G06K 9/00818; G06T 2207/30252; G06T 7/70
See application file for complete search history.

(56) References Cited

FOREIGN PATENT DOCUMENTS

| KR | 10-2014-0061156 | 5/2014 |
|---|---|---|
| KR | 10-2014-0098557 | 8/2014 |
| KR | 10-2015-0029122 | 3/2015 |
| KR | 10-2015-0049529 | 5/2015 |
| WO | 2013/052812 | 4/2013 |

OTHER PUBLICATIONS

H. Fleyeh and E. Davami, "Eigen-based Traffic Sign Recognition" 2011, IET Intelligent Transport Systems, vol. 5, Iss. 3, pp. 190-196.*

Hai Nguyen Thanh, "Morphological Classification for Traffic Sign Recognition", 2014, Electrical and Electronic Engineering, 4(2): pp. 36-44.*

(Continued)

*Primary Examiner* — Siamak Harandi
(74) *Attorney, Agent, or Firm* — Ladas & Parry, LLP

(57) ABSTRACT

Disclosed are an apparatus and a method for detecting a bar-type sign in a traffic sign recognition system. The method may include a traffic sign detection step of detecting a traffic sign from image information including the traffic sign; a recognition region setting step of setting a recognition region on the traffic sign detected through the traffic sign detection step; a principal component analysis (PCA) operation processing step of applying a PCA algorithm to all pixels in the recognition region set through the recognition region setting step, and determining an eigenvector; and a sign determination step of determining an angle "α" of the eigenvector, comparing a deviation "d" of the determined angle with a threshold value "Pt", and determining whether to correspond to a bar-type sign.

8 Claims, 7 Drawing Sheets

(56) References Cited

OTHER PUBLICATIONS

Office Action dated Dec. 22, 2016 for Korean Patent Application No. 10-2016-0052769 and its English summary, and machine translation by Google Translate.
Notice of Allowance dated Jun. 22, 2017 for Korean Patent Application No. 10-2016-0052769 and its English translation provided by Applicant's foreign council.

* cited by examiner

[Fig. 1]
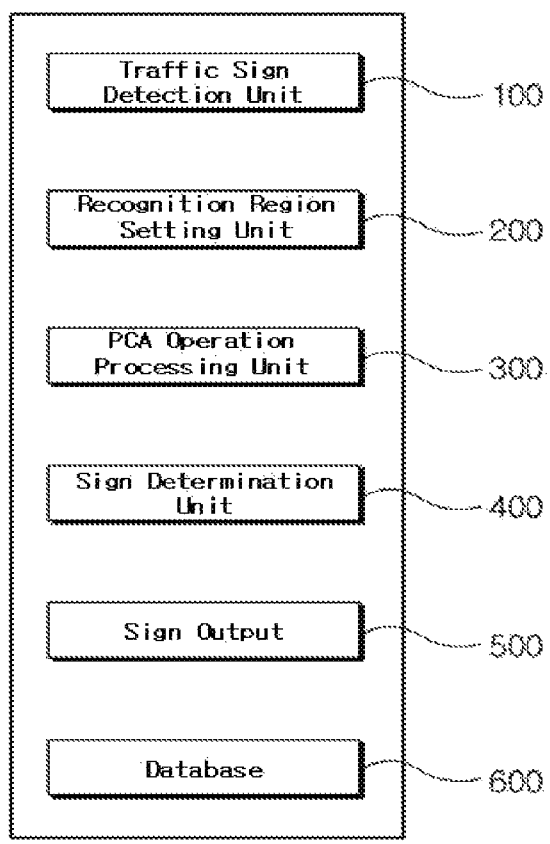

[Fig. 2]
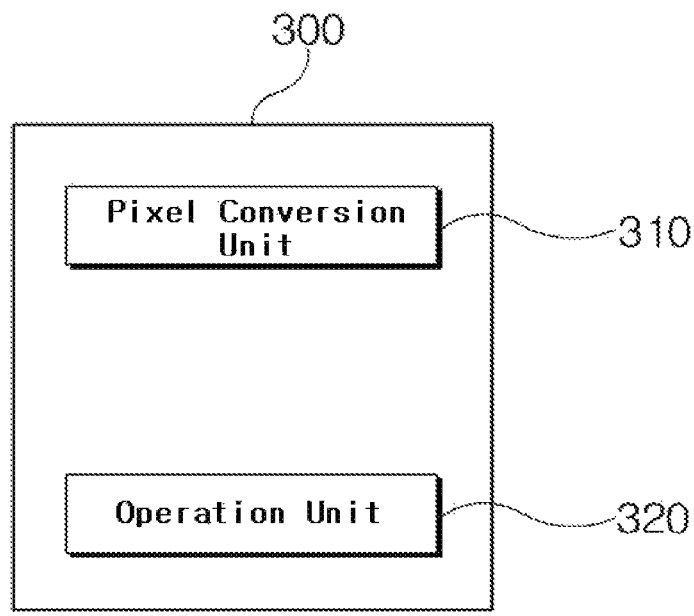
[Fig. 3]
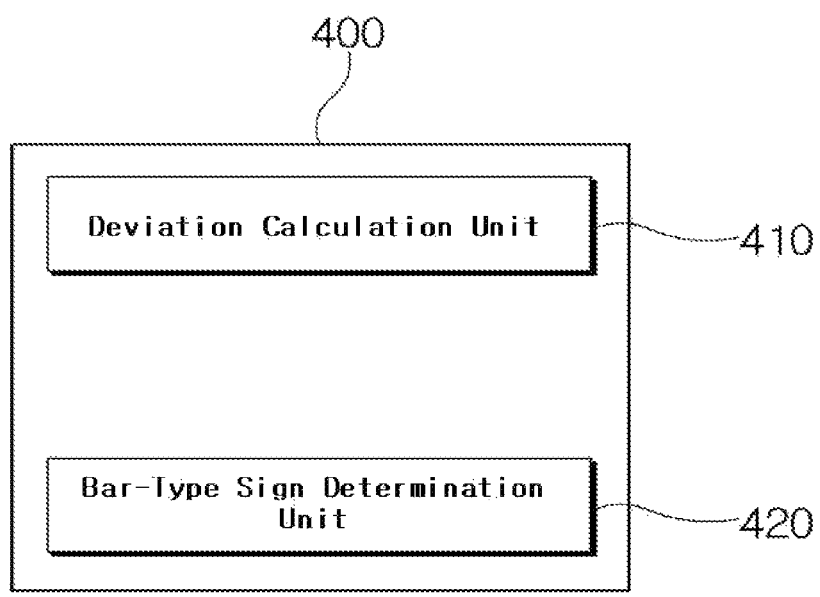

[Fig. 4]
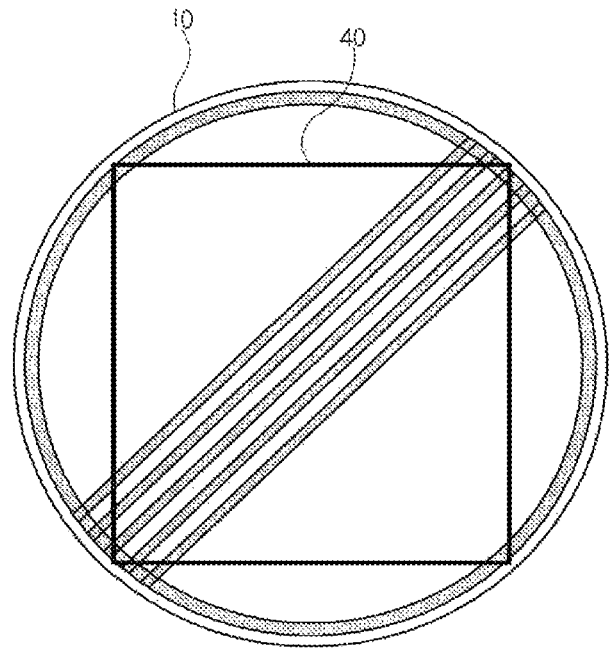
[Fig. 5]
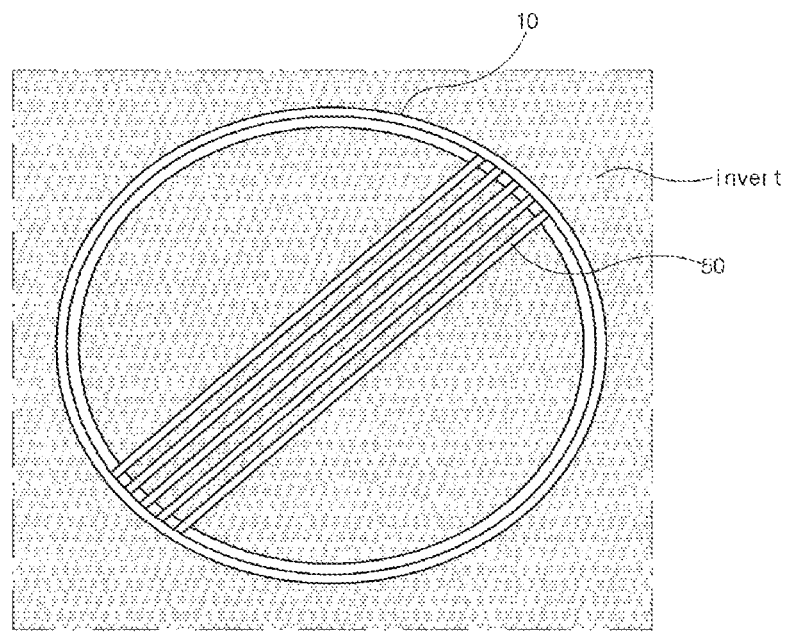

[Fig. 6]
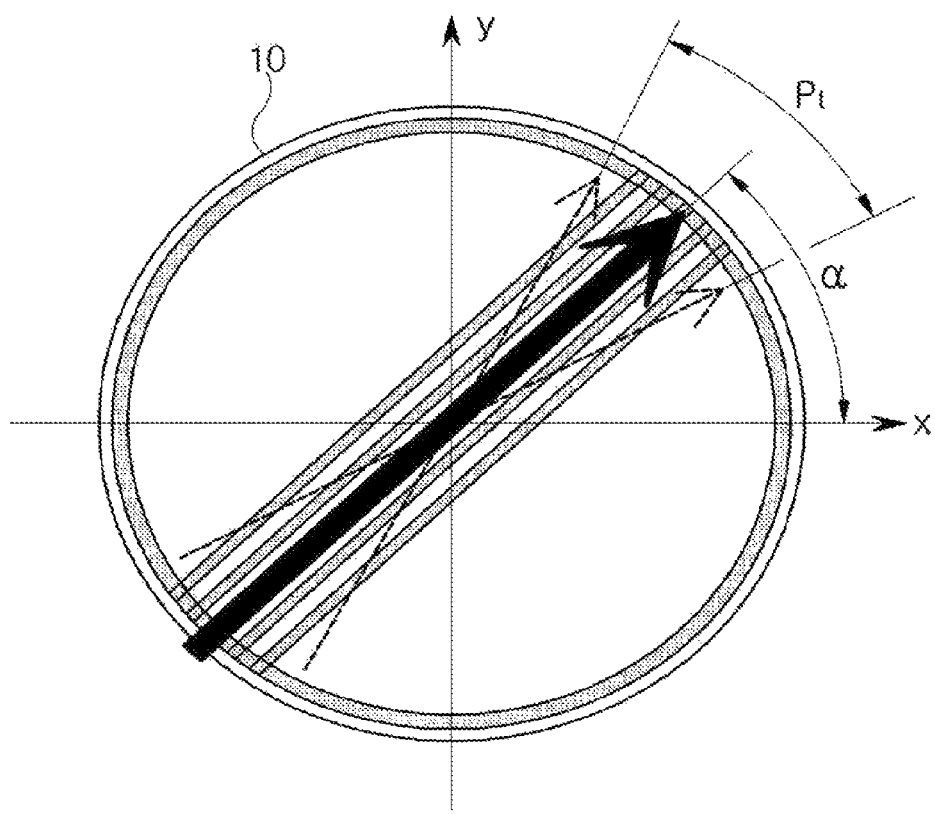

[Fig. 7]
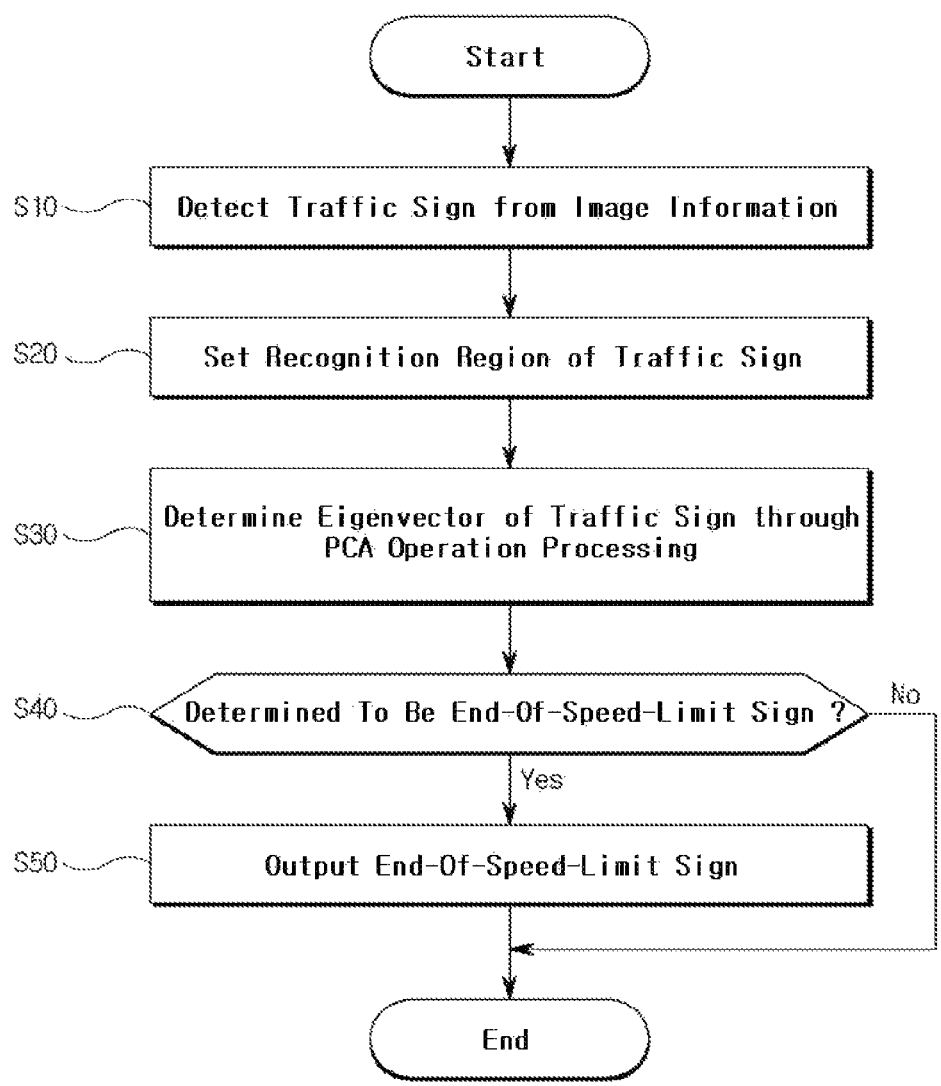

[Fig. 8]
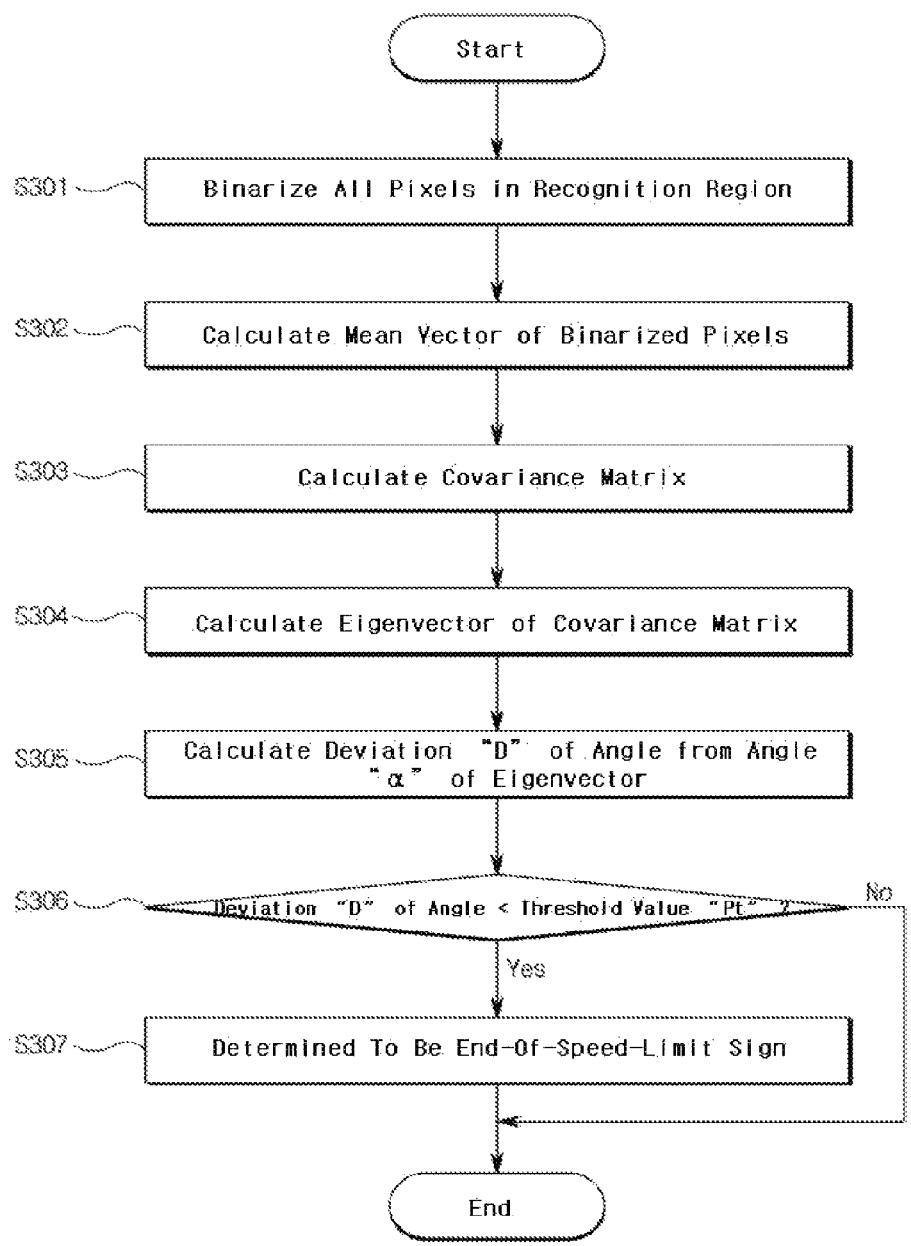

[Fig. 9]
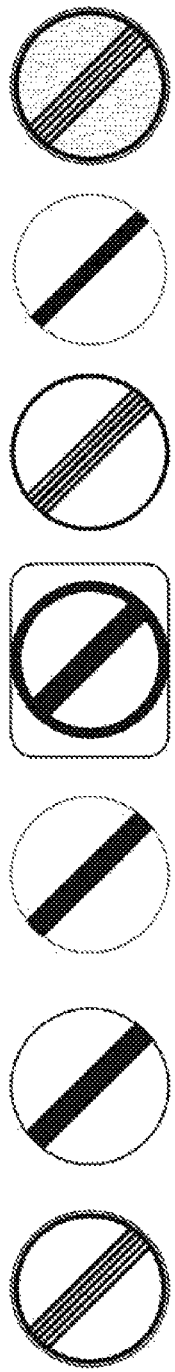

APPARATUS AND METHOD FOR DETECTING BAR-TYPE TRAFFIC SIGN IN TRAFFIC SIGN RECOGNITION SYSTEM

CROSS-REFERENCE TO RELATED APPLICATION

This application claims the priority to German Patent Application No. 102015207903.1, filed on Apr. 29, 2015, the disclosure of which is incorporated herein by reference in its entirety.

BACKGROUND OF THE INVENTION

Field of the Invention

Exemplary embodiments of the present invention relate to a method and apparatus for detecting a bar-type sign in a traffic sign recognition system, and more particularly, to a traffic sign recognition system and method for effectively detecting a bar-type traffic sign, e.g. an end-of-speed-limit sign, using a principal component analysis (PCA).

Description of the Related Art

Recently, for the convenience of a driver, various functions using a front camera of a vehicle have been developed. For example, there are functions for warning lane departure, vehicle collision detection, and the like, and further, a front camera of a vehicle includes a traffic sign recognition algorithm for recognizing a traffic sign built on a road, along which a vehicle is traveling, and notifying the driver of information on the corresponding traffic sign.

In more detail, a traffic sign recognition (TSR) technique for automatically recognizing a front speed sign using a front camera and providing speed limit information to a driver is currently in common use. The conventional speed sign recognition algorithm has a general recognition performance of detecting a region in which a traffic sign exists using a pattern recognition algorithm with respect to a basic image, recognizing contents of the corresponding traffic sign in the detected region, and notifying a driver of the contents expressed on the corresponding traffic sign when a moving vehicle passes through the corresponding traffic sign.

However, errors occur frequently due to inaccurate recognition of contents, i.e. a numeral, a line, or the like, expressed on a traffic sign. Thus, a more accurate traffic sign recognition algorithm has been required.

RELATED ART DOCUMENT

Patent Document

WO2013-052812 A1 (Published on Apr. 11, 2013)

SUMMARY OF THE INVENTION

An object of the present invention is to provide a method and apparatus for accurately detecting a bar-type sign inclined in a diagonal direction by tracking a traffic sign successively appearing in an image and using a principal component analysis (PCA), with respect to the image which is obtained by photographing a bar-type sign in the forward area of a vehicle using a camera mounted on the front side of the vehicle.

In accordance with one aspect of the present invention, a method for detecting a bar-type sign in a traffic sign recognition system is provided, wherein the method may include: a traffic sign detection step of detecting a traffic sign from image information including the traffic sign; a recognition region setting step of setting a recognition region on the traffic sign detected through the traffic sign detection step; a principal component analysis (PCA) operation processing step of applying a PCA algorithm to all pixels in the recognition region set through the recognition region setting step, and determining an eigenvector; and a sign determination step of determining an angle of the eigenvector, comparing a deviation of the determined angle with a threshold value, and determining whether to correspond to a bar-type sign.

Here, in the recognition region setting step, a rectangular recognition region may be set on the detected traffic sign.

The PCA operation processing step may include the steps of: binarizing all pixels in the recognition region; calculating a mean vector of the binarized pixels; calculating a covariance matrix based on the mean vector value; and calculating an eigenvector of the covariance matrix.

The sign determination step may include the steps of: determining an angle "$\alpha$" of the eigenvector; calculating a deviation "$d$" of the determined angle "$\alpha$"; and determining a bar-type sign by comparing the deviation "$d$" of the angle "$\alpha$" with a threshold value "$Pt$".

Here, the deviation "$d$" of the angle "$\alpha$" may be calculated by equation $d=|\alpha-45°|$, wherein, when the deviation "$d$" is less than the threshold value "$Pt$", which has been set to detect an end-of-speed-limit sign, a corresponding sign may be determined to be an end-of-speed-limit sign.

In addition, the method may additionally include the steps of: determining a bar-type sign according to a range of a difference between the deviation "$d$" and the threshold value "$Pt$"; and determining a traffic sign meant by a bar-type sign which corresponds to a range of a difference between each deviation "$d$" and the threshold value "$Pt$".

The sign determination step may include the steps of: receiving front image information of a vehicle which is photographed through a front camera; detecting a traffic sign from the front image information using object detection; and tracking a traffic sign successively appearing in the front image information and eliminating a misrecognized object.

In addition, the sign determination step may additionally include a step of outputting a traffic sign corresponding to a bar-type sign when a sign is determined to be the bar-type sign.

In accordance with another aspect of the present invention, an apparatus for detecting a bar-type sign in a traffic sign recognition system is provided, wherein the apparatus may include: a traffic sign detection unit for receiving image information including a traffic sign from a camera module, and detecting a traffic sign from the image information; a recognition region setting unit for setting a recognition region for detection of a bar-type sign on the traffic sign detected by the traffic sign detection unit; a PCA operation processing unit for applying a PCA algorithm to all pixels in the recognition region set by the recognition region setting unit, and determining an eigenvector; and a sign determination unit for determining a deviation of an angle from the angle of the eigenvector, comparing the deviation with a threshold value, and determining whether the traffic sign corresponding to a bar-type sign.

In addition, the PCA operation processing unit may include: a pixel conversion unit for converting all pixels in the recognition region into inverted, binarized or normalized color coordinates; and an operation unit for calculating a mean vector of the converted pixels, calculating a covariance matrix based on the mean vector value, and calculating an eigenvector.

In addition, the sign determination unit may include: a deviation calculation unit for determining the angle of the eigenvector, and calculating the deviation of the determined angle; and a bar-type sign determination unit for comparing the deviation of the angle with the threshold value, and determining a bar-type sign.

The deviation calculation unit may calculate the deviation "d" by d=|α−45°| (wherein "d" represents a deviation, and "α" represents the angle of an eigenvector); wherein when the deviation "d" is less than a threshold value "Pt", which is preset to determine an end-of-speed-limit sign, the bar-type sign determination unit may determine that a corresponding sign corresponds to an end-of-speed-limit sign.

In addition, the apparatus may additionally include a sign output unit for outputting a traffic sign corresponding to a determined bar-type sign when the sign determination unit has determined a sign to be a bar-type sign.

In addition, the sign determination unit determines the meaning of a bar-type sign according to the range of the difference between a deviation and the threshold value, and the apparatus may additionally include a database for storing traffic signs meant by bar-type signs which correspond to the respective ranges of differences between the respective deviations and the threshold value.

In addition, the traffic sign detection unit may be configured to detect a traffic sign from the image information using object detection, to track a traffic sign successively appearing in the image information, and to eliminate a misrecognized object.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a functional block diagram illustrating the configuration of an apparatus for detecting a bar-type sign in a traffic sign recognition system according to an embodiment of the present invention;

FIG. 2 is a functional block diagram illustrating the configuration of a PCA operation processing unit according to an embodiment of the present invention;

FIG. 3 is a functional block diagram illustrating the configuration of a sign determination unit according to an embodiment of the present invention;

FIG. 4 is a view illustrating a traffic sign in which a recognition region is set according to an embodiment of the present invention;

FIG. 5 is a view obtained by inverting the traffic sign illustrated in FIG. 4;

FIG. 6 is a view explaining a process of performing determination of a bar-type sign through comparison with a threshold value according to an embodiment of the present invention;

FIG. 7 is a flowchart illustrating a method for detecting a bar-type sign in a traffic sign recognition system according to an embodiment of the present invention;

FIG. 8 is a flowchart illustrating a method for determining a bar-type sign through a PCA algorithm according to an embodiment of the present invention; and FIG. 9 is a view illustrating bar-type traffic signs according to an embodiment of the present invention.

DESCRIPTION OF SPECIFIC EMBODIMENTS

As the present invention may make various changes and have various forms, it is intended to illustrate specific embodiments in the drawings and describe them in detail. However, it should be understood that this is intended not to limit the present invention to specific disclosed forms but to include all changes, equivalents and replacements that fall within the spirit and technical scope of the present invention.

A speed limit sign recognition system and method using a front camera according to embodiments of the present invention will be described in detail below with reference to the accompanying drawings. In the accompanying drawings, the same or corresponding elements have the same reference numerals allotted, and description thereof will not be repeated.

FIG. 1 is a functional block diagram illustrating the configuration of an apparatus for detecting a bar-type sign in a traffic sign recognition system according to an embodiment of the present invention.

As illustrated in FIG. 1, according to an embodiment of the present invention, an apparatus for detecting a bar-type sign in a traffic sign recognition system may include a traffic sign detection unit 100, a recognition region setting unit 200, a principal component analysis (PCA) operation processing unit 300, a sign determination unit 400, a sign output unit 500, and a database 600.

The traffic sign detection unit 100 may receive an image in the moving direction of a vehicle, which has been acquired through a camera mounted on the vehicle, and may detect a traffic sign from image information.

According to an embodiment of the present invention, the traffic sign detection unit 100 may perform a detection operation on a traffic sign using a Haar-Feature based Viola-Jones Adaptive Boosting (Adaboost) algorithm, which is used for object detection.

Here, the Adaptive Boosting algorithm includes a plurality of strong classifiers having a cascade structure, and makes it possible to identify whether an input image corresponds to a "traffic sign" or a "non-traffic sign".

In addition, the adaptive boosting algorithm includes: a traffic sign training (sample training) step of training the traffic sign detection unit 100 using a traffic sign image (positive sample) which is an actual target to be recognized, and a non-traffic sign image (negative sample); and a scan-window check step of determining whether a sub-window, which is received using a scan-window search scheme with respect to a region of interest (ROI) of a front image, corresponds to an actual "traffic sign" or a "non-traffic sign".

In addition, the traffic sign image (positive sample) is obtained by adding one or two margin pixels to an extracted image and then normalizing the resultant image into a size of 20×20, and the non-traffic sign image (negative sample) is randomly extracted from an image which does not include a traffic sign. In addition, the traffic sign detection unit 100 can be trained with traffic sign images (positive samples) and non-traffic sign images (negative samples) which are in a ratio of 1:2 in number.

In addition, the traffic sign detection unit 100 may include a horizontal detector and a vertical detector. The horizontal detector may have been trained only for a part constituted by 20 horizontal and 10 vertical within an image normalized into a size of 20×20, and the vertical detector may have been trained only for a part constituted by 10 horizontal and 20 vertical within an image normalized into a size of 20×20.

The traffic sign detection unit 100 may detect a region in which the horizontal detector and the vertical detector are overlapped, as an actual "traffic sign" region.

In addition, the traffic sign detection unit 100 may include a tracking unit (not shown). The tracking unit may track a traffic sign successively appearing in front images and eliminate a temporarily misrecognized object.

In addition, the tracking unit may track a traffic sign according to template matching, set the inside of a traffic sign recognized in an image of time "t", as a template, limit a region of interest (ROI) in an image of time "t+1" on the basis of the moving speed of the corresponding vehicle, update tracking contents when a traffic sign exists in the limited region of interest, and maintain a previous state when a traffic sign does not exists therein.

The recognition region setting unit 200 may set a recognition region with respect to a traffic sign detected by the traffic sign detection unit 100.

The recognition region setting unit 200 may set a recognition region, e.g. a recognition region having a rectangular form, in the inside of a traffic sign.

FIG. 4 is a view illustrating a traffic sign in which a recognition region 40 is set according to an embodiment of the present invention.

FIG. 4 shows a bar-type traffic sign 10 detected by the traffic sign detection unit 100, and illustrates an end-of-speed-limit sign 10.

The end-of-speed-limit sign expresses the meaning that the running speeds of vehicles are not limited on a highway. FIG. 9 illustrates end-of-speed-limit signs used in various countries.

Referring to FIG. 9, according to countries, end-of-speed-limit signs having mutually slightly different traffic designs are used, but bar-type marks are used in common. In more detail, traffic signs show bar-type diagonal lines which are connected from a left lower end to a left lower end to a right upper end with respect to a circular traffic sign. That is to say, the traffic signs show diagonal lines at an angle of 45 degrees in the x axis and y axis directions with zero point as its center.

As shown in FIG. 4, the recognition region setting unit 200 sets a recognition region 40 in a traffic sign 10, so that it is possible to intensively analyze the traffic sign 10, and to accurately and rapidly detect a traffic sign marked in the traffic sign 10.

FIG. 2 is a functional block diagram illustrating the configuration of a PCA operation processing unit 300 according to an embodiment of the present invention.

The PCA operation processing unit 300 applies a PCA algorithm to the recognition region 40, thereby enabling the traffic sign in a recognition region part to be accurately recognized. In more detail, the PCA operation processing unit 300 can determine an eigenvector of a silhouette which is detected from the recognition region 40 through the PCA algorithm.

The principal component analysis (PCA) is a method for fining out a principal component of distributed data. PCA is not a method for individually analyzing the respective components of data, but is a method for analyzing a principal component of a distribution when multiple pieces of data are grouped to form the distribution. Here, the principal component means a direction vector, in the direction of which the distribution of data is the largest.

The PCA returns two mutually perpendicular principal component vectors when the PCA has been performed on a two-dimensional data set, and returns three mutually perpendicular principal component vectors when the PCA has been performed on three-dimensional points. For example, with respect to three-dimensional data, three mutually perpendicular principal component vectors are detected as follows.

The PCA operation processing unit 300 may include a pixel conversion unit 310 and an operation unit 320.

The pixel conversion unit 310 may convert all pixels in a recognition region into inverted, binarized, or normalized color coordinates. That is to say, even when a traffic sign is configured with RGB, Gray, Batyer, or the like, the pixels in a recognition region can be converted to be easily analyzed.

The binarized image means an image in which all pixels are represented with only black and white. That is to say, the binarized image means an image in which brightness is expressed with only zero and one, i.e. pure black and white.

A grayscale image is expressed with only 256-step brightness.

That is to say, the pixel conversion unit can separate a bar-type silhouette from a background through pixel conversion in a recognition region. Since a traffic sign is a two-dimensional image, the pixels in a recognition region have x and y coordinates.

FIG. 5 is a view obtained by inverting the traffic sign illustrated in FIG. 4.

Referring to FIG. 5, it can be confirmed that a bar-type sign, i.e. a diagonal display portion, is brightly displayed as a traffic sign detected from FIG. 4 is inverted.

The operation unit 320 may calculate a mean vector of pixels converted as above, calculate a covariance matrix on the basis of the mean vector value, and calculate an eigenvector.

A covariance of "x" and "y" may be defined as equation 1.

$$\text{cov}(x, y) = E[(x - m_x)(y - m_y)] \quad (1)$$
$$= E[xy] - m_x m_y$$

Here, "$m_x$" represents a mean value of "x" values, and "my E[a]" represents a mean value of "a".

The variance of "x" represents how far "x" values are spread out with respect to a mean, and the covariance of "x" and "y" represents a correlation in spread degrees between "x" and "y". For example, in the state in which the variance of each of "x" and "y" is constant: when "y" becomes greater than "$m_y$" as "x" becomes greater than "$m_x$", the covariance becomes the maximum; when "y" becomes less than "$m_y$" as "x" becomes greater than "$m_x$", the covariance becomes the minimum (i.e. becomes a negative number); and when there is no correlation between "x" and "y", the covariance becomes zero.

A covariance matrix has covariance values between coordinate components of data, as the elements thereof. The covariance matrix has a covariance value between a $j^{th}$ coordinate component and an $i^{th}$ coordinate component of data as an i-row j-column element value of the matrix.

The covariance matrix may be calculated as equation 2.

$$C = \begin{pmatrix} \text{cov}(x, x) & \text{cov}(x, y) \\ \text{cov}(x, y) & \text{cov}(x, y) \end{pmatrix} \quad (2)$$
$$= \begin{pmatrix} \frac{1}{n}\Sigma(x_i - m_x)^2 & \frac{1}{n}\Sigma(x_i - m_x)(y_i - m_y) \\ \frac{1}{n}\Sigma(x_i - m_x)(y_i - m_y) & \frac{1}{n}\Sigma(y_i - m_y)^2 \end{pmatrix}$$

Here, "n" represents the number of pixels.

An eigenvector may be calculated as equation 3.

$$\begin{bmatrix} \text{cov}(X,X) & \text{cov}(X,Y) \\ \text{cov}(Y,X) & \text{cov}(Y,Y) \end{bmatrix} \begin{bmatrix} x \\ y \end{bmatrix} = \lambda \begin{bmatrix} x \\ y \end{bmatrix} \quad (3)$$

Here, "$\lambda$" represents an eigenvalue, and $$\begin{bmatrix} x \\ y \end{bmatrix}$$

represents an eigenvector.

An eigenvector calculated by equation 3 is a principal vector, and represents a direction in which a variance is great in the distribution of pixels, wherein a corresponding eigenvalue represents the degree of the variance.

That is to say, according to the procedure of deriving an eigenvector through the operation unit 320, the portion of the brightly displayed diagonal line 50 of FIG. 5 have a relatively higher weight value than a dark background portion.

That is to say, this may mean that a value derived as an eigenvector is derived in a direction which is similar to that of the vector values of pixels constituting a diagonal line.

Therefore, through an eigenvector derived through the operation unit 320, an inclined degree of a bar-type sign (e.g. the diagonal line of FIG. 5) expressed on a traffic sign can be identified.

FIG. 3 is a functional block diagram illustrating the configuration of the sign determination unit 400 according to an embodiment of the present invention.

The sign determination unit 400 may include a deviation calculation unit 410 and a bar-type sign determination unit 420.

The deviation calculation unit 410 may determine the angle "$\alpha$" of an eigenvector, and may calculate the deviation "d" of the determined angle "$\alpha$".

FIG. 6 is a view explaining a process in which the bar-type sign determination unit 420 performs the determination of a bar-type sign through comparison with a threshold value according to an embodiment of the present invention.

Referring to FIG. 6, an eigenvector calculated from a recognition region of a traffic sign can be identified. The straight line shown as an arrow represents an eigenvector, and the angle of the arrow can be identified by an angle from an x axis. In the present specification, the angle of the arrow will be illustratively referred to as "$\alpha$" for the purpose of illustration.

A threshold value "Pt" may be preset to determine whether a bar-type sign represents a specific traffic sign.

According to an embodiment of the present invention, an end-of-speed-limit sign is exemplified, but the present invention is not limited thereto.

The end-of-speed-limit sign has diagonal lines which are formed at about 45 degrees in the first and third quarters with the center of a circular traffic sign 10 as an origin.

In this case, the threshold value "Pt" may be set by taking an error value into consideration so as not to excessively deviate from about 45 degrees.

In this case, the deviation of an angle may be calculated as equation 4.

$$d = |\alpha - 45°| \quad (4)$$

When the deviation "d" is less than the threshold value "Pt" which has been set to detect an end-of-speed-limit sign, a corresponding sign may be determined to be an end-of-speed-limit sign.

When a sign deviates from the threshold value "Pt", which means that the sign gets out of a pre-appointed end-of-speed-limit sign mark, the sign is not determined to be an end-of-speed-limit sign.

According to another embodiment of the present invention, when there is a bar-type traffic sign inclined to have a greater deviation "d" than the threshold value "Pt", a range deviating from the threshold value "Pt" may be set. In addition, mutually different ranges may be set to mutually different traffic signs, respectively.

For example, when a stop sign is formed at 180 degrees in a circular traffic sign, a range deviating from the threshold value "Pt", i.e. a range to detecting the stop sign, may be set to be formed in the vicinity of an "x" axis.

In addition, according to implementations, the method for determining a bar-type sign according to an embodiment of the present invention, described with reference to FIG. 6, may be used to detect traffic signs (e.g. a horizontal bar shape, a vertical bar shape, or the like) formed at a different angle, in addition to the diagonal bar-type traffic sign. For example, 180 degrees instead of 45 degrees may be applied in equation 4 when detecting a horizontal bar-type traffic sign, and 90 degrees instead of 45 degrees may be applied in equation 4 when detecting a vertical bar-type traffic sign.

The sign output unit 500 may output a sign determined by the sign determination unit 400.

The sign output unit 500 may include all means, including a speaker, a display, a vibration, or the like, capable of notifying a user of the sign.

The database 600 may store the threshold value "Pt" to determine a bar-type sign and information on a range to which deviations deviating from the threshold value "Pt" correspond.

That is to say, the apparatus for detecting a bar-type sign in a traffic sign recognition system identifies the angle of an eigenvector calculated using the PCA algorithm, and thus can accurately detect a bar-type sign.

FIG. 7 is a flowchart illustrating a method for detecting a bar-type sign in a traffic sign recognition system according to an embodiment of the present invention.

As shown in FIG. 7, the method according to an embodiment of the present invention may include step S10 of detecting a traffic sign from image information, step S20 of setting a recognition region of the traffic sign, step S30 of determining an eigenvector of the traffic sign through a PCA operation processing, step S40 of determining an end-of-speed-limit sign, and step S50 of outputting the end-of-speed-limit sign.

Step S10 of detecting a traffic sign may include the steps of: receiving front image information of a vehicle photographed through a front camera; detecting a traffic sign from the front image information using object detection; and tracking a traffic sign successively appearing in the front image information, and eliminating a misrecognized object.

Step S20 of setting a recognition region may be performed to set a rectangular recognition region with respect to a detected traffic sign. The recognition region is not limited to the rectangular shape, but may be set to have various shapes.

Step S30 of performing a PCA operation processing may include the steps of: binarizing all pixels in the recognition region; calculating a mean vector of the binarized pixels;

calculating a covariance matrix based on a mean vector value; and calculating an eigenvector of the covariance matrix.

Step S40 of determining a sign may include the steps of: determining an angle "α" of an eigenvector; calculating a deviation "d" of the determined angle "α"; and comparing the deviation "d" of the angle "α" with a threshold value "Pt", and determining a bar-type sign.

Here, the deviation "d" of the angle "α" may be calculated by d=|α−45°|, and the corresponding sign may be determined to be an end-of-speed-limit sign when the deviation "d" is less than the threshold value "Pt", which has been set to detect an end-of-speed-limit sign.

In addition, step S40 of determining a sign may additionally include the steps of: determining bar-type signs according to the ranges of the differences between deviations "d" and the threshold value "Pt"; and determining the respective traffic signs meant by bar-type signs which correspond to the ranges of the differences between the deviations "d" and the threshold value "Pt".

Steps 30 and 40 will be described in more detail with reference to FIG. 8.

FIG. 8 is a flowchart illustrating a method for determining a bar-type sign through a PCA algorithm according to an embodiment of the present invention. Although FIG. 8 shows an end-of-speed-limit sign among bar-type signs for the purpose of illustration, the present invention is not limited thereto, and a traffic sign may be determined according to a difference between the threshold value "Pt" and a deviation "d".

As shown in FIG. 8, the method for determining a bar-type sign through a PCA algorithm may include: step S301 of binarizing all pixels in a recognition region; step S302 of calculating a mean vector of the binarized pixels; step S303 of calculating a covariance matrix; step S304 of calculating an eigenvector of the covariance matrix; step S305 of calculating a deviation "d" of an angle from the angle "α" of the eigenvector; step S306 of comparing the deviation "d" of the angle with the threshold value "Pt"; and step S307 of determining a corresponding sign to be an end-of-speed-limit sign when the deviation "d" of the angle is less than the threshold value "Pt".

Step S301 of binarizing all pixels in a recognition region may be replaced by a step of all the pixels into inverted or normalized color coordinates.

That is to say, through such an algorithm using a PCA, bar-type traffic signs can be accurately detected by the eigenvectors thereof and the angles thereof.

According to the present invention, a bar-type sign, e.g. an end-of-speed-limit sign, can be accurately detected from a road image obtained by photographing the forward area of a vehicle.

In addition, an inclined degree of a bar shape, which has been detected from a sign through a principal component analysis of an eigenvector, is determined using a PCA algorithm, so that the types of traffic signs can be accurately detected.

Since those skilled in the art to which the present invention belongs may understand that the present invention may be carried out in other specific forms without changing the technical concepts or essential features thereof, it should be understood that the examples stated above are illustrative in every way, not limitative. The scope of the present invention is defined by the following claims, and all modified or varied forms derived from the meaning and scope of the claims and also equivalent concepts thereof should be interpreted to be included in the scope of the present invention.

What is claimed is:

1. An apparatus for detecting a bar-type sign in a traffic sign recognition system, the apparatus comprising:
    a traffic sign detection unit for receiving image information including a traffic sign from a camera module, and detecting a traffic sign from the image information;
    a recognition region setting unit for setting a recognition region for detection of a bar- type sign on the traffic sign detected by the traffic sign detection unit;
    a principal component analysis PCA operation processing unit for applying a PCA algorithm to all pixels in the recognition region set by the recognition region setting unit, and determining an eigenvector; and
    a sign determination unit for determining a deviation of an angle from the angle of the eigenvector, comparing the deviation with a threshold value, and determining whether the traffic sign corresponds to a bar-type sign.

2. The apparatus according to claim 1, wherein the PCA operation processing unit comprises:
    a pixel conversion unit for converting all pixels in the recognition region into inverted, binarized or normalized color coordinates; and
    an operation unit for calculating a mean vector of the converted pixels, calculating a covariance matrix based on the mean vector value, and calculating an eigenvector.

3. The apparatus according to claim 1, wherein the sign determination unit comprises:
    a deviation calculation unit for determining the angle of the eigenvector, and calculating the deviation of the determined angle; and
    a bar-type sign determination unit for comparing the deviation of the angle with the threshold value, and determining a bar-type sign.

4. The apparatus according to claim 3, wherein the deviation calculation unit calculates the deviation "d" as follows:
    d=|α−45°| (wherein "d" represents a deviation, and "α" represents the angle of an eigenvector); wherein
    when the deviation "d" is less than a threshold value "Pt", which is preset to determine an end-of-speed-limit sign, the bar-type sign determination unit determines that a corresponding sign corresponds to an end-of-speed-limit sign.

5. The apparatus according to claim 3, further comprising a sign output unit for outputting a traffic sign corresponding to a determined bar-type sign when the sign determination unit has determined a sign to be a bar-type sign.

6. The apparatus according to claim 3, further comprising a database for storing traffic signs meant by bar-type signs which correspond to the respective ranges of differences between deviations and the threshold value, according to the ranges of differences between the deviations and the threshold value,
    wherein the sign determination unit determines the meaning of a bar-type sign according to the range of the difference between a deviation and the threshold value.

7. The apparatus according to claim 1, wherein the traffic sign detection unit is additionally configured to detect a traffic sign from the image information using object detection, to track a traffic sign successively appearing in the image information, and to eliminate a misrecognized object.

8. A method for detecting a bar-type sign in a traffic sign recognition system, the method comprising:
    a traffic sign detection step of detecting a traffic sign from image information including the traffic sign;

a recognition region setting step of setting a recognition region on the traffic sign detected through the traffic sign detection step;
a principal component analysis (PCA) operation processing step of applying a PCA algorithm to all pixels in the recognition region set through the recognition region setting step, and determining an eigenvector; and
a sign determination step of determining an angle of the eigenvector, comparing a deviation of the determined angle with a threshold value, and determining whether to correspond to a bar-type sign.

* * * * *